April 3, 1951 P. A. NEWMAN 2,547,832
MACHINE TOOL
Filed Aug. 29, 1947 7 Sheets-Sheet 3

INVENTOR.
PERCY A. NEWMAN,
BY
ATTORNEYS.

April 3, 1951 P. A. NEWMAN 2,547,832
MACHINE TOOL
Filed Aug. 29, 1947 7 Sheets-Sheet 5

INVENTOR.
PERCY A. NEWMAN,
BY
ATTORNEYS.

April 3, 1951 P. A. NEWMAN 2,547,832
MACHINE TOOL
Filed Aug. 29, 1947 7 Sheets-Sheet 6

INVENTOR.
PERCY A. NEWMAN,
BY
ATTORNEYS.

Patented Apr. 3, 1951

2,547,832

UNITED STATES PATENT OFFICE 2,547,832

MACHINE TOOL

Percy A. Newman, La Fayette, Ind., assignor to Ross Gear and Tool Company, La Fayette, Ind., a corporation of Indiana Application August 29, 1947, Serial No. 771,249

12 Claims. (Cl. 90—11.5)

This invention relates to a machine for forming generally helical cams of the type employed in the cam and lever steering gears described in United States Letters Patent Nos. 1,567,997 and 2,071,235, issued respectively to David E. Ross and to me. The Ross cam and lever steering gear embodies a driven rock shaft having a radially projecting arm bearing near its outer end a boss which projects parallel to the rock shaft axis and is received in a generally helical groove in a cam operatively connected to the steering wheel. The theoretical mechanical advantage of such a steering gear depends upon the ratio between angular movement of the cam and angular movement of the rock shaft, and may either vary or be constant throughout the range of cam rotation.

It has previously been proposed, as in my prior Patent No. 2,234,382, granted March 11, 1941, to form a cam for a Ross steering gear by employing a cutter corresponding in shape and size to the boss of the steering gear and moving such cutter over a circular arc, corresponding to the path of boss-travel, through the blank as the latter is rotated, the ratio between the rate of blank-rotation and of cutter movement being controlled to produce a cam of the desired pitch characteristics.

It is the object of the present invention to improve the machine of my aforesaid prior patent. More specifically, it is an object of this invention to produce a cam-cutting machine adapted for automatic operation and capable of proceeding automatically through a cycle including the steps of moving the cutter axially of itself into association with the blank, feeding the cutter through the blank as the latter rotates, retracting the cutter from association with the blank, returning it to its initial position, and releasing the blank.

Another object of the invention is to provide an automatic machine in which release of the blank from between headstock and tailstock centers prior to the completion of the cutting operation will be positively prevented.

A further object of the invention is to provide an improved means for taking up lost motion or back-lash between the blank and the cutter-mounting, whereby to insure uniformity in the width of the cam groove and an accurate control of its pitch at all points throughout its extent.

Other objects of the invention include the provision of an improved means for driving the cutter and the provision of cutter-positioning mechanism adapted for power operation and automatic control.

In carrying out my invention in its preferred form, I mount the cutter spindle eccentrically within a rotating drum and parallel to the drum-axis. The cutter spindle projects beyond the drum at both ends thereof, one projecting end of the spindle being adapted to receive the cutter and the other projecting end bearing a pulley belt-connected to an independently mounted cutter-driving motor. To rotate the drum, it is provided with a gear or gear-sector meshing with a rack controlled in position by a movable cam the contour of which determines the pitch of the cam groove at any point in its length. The cam-moving mechanism is driven from a headstock spindle which is directly and positively connected with the cam blank, so that the rate of cam movement will depend upon the rate at which the headstock spindle rotates. To take up lost motion between the headstock spindle and the drum which supports the cutter, such drum is provided with a second gear or gear-sector meshing with a second rack operatively connected to the piston of a hydraulic cylinder in which there is maintained a fluid pressure such that the two racks exert opposing drum-rotating efforts. Power-operated means, conveniently hydraulic, is employed to move the drum axially of itself and thus to move the cutter into and out of association with the blank. The headstock spindle, and through it the cam-moving mechanism, is driven from a reversible motor; and such motor, together with valves controlling the hydraulic drum-moving means and the tailstock, are automatically controlled by mechanism including switches actuated by moving parts. The preferred machine also includes a tailstock clamp which is automatically actuated at the beginning of each cam-cutting operation to lock the tailstock in advanced, blank-supporting position until after the cutting operation has been completed and the cutter restored to its initial position.

The accompanying drawings illustrate a preferred form of machine embodying my invention.

The machine shown in the drawings comprises a hollow base 15 from which there projects upwardly a column 16 carrying a housing 17. Within the housing 17 a drum 18 is mounted for rotation about a vertical axis as well as for vertical sliding movement. Within the drum 18, there is rotatably mounted a cutter-spindle 19, the axis of which is parallel but eccentric to the axis of the drum. The lower end of the cutter spindle 19 projects downwardly beyond the drum and is there equipped for the reception of a milling cutter 20. Because of the eccentric position of the spindle 19 in the drum 18, the cutter 20 will move over an arcuate path when the drum 18 is rotated in the housing 17. The eccentricity of the cutter-spindle 19 corresponds to the center-line distance between the driven rock shaft and the cam-engaging boss in the steering gear above referred to, and the shape and size of the cutter 20 corresponds to the size and shape of such boss.

For the purpose of supporting a cam blank in co-operative relation with the cutter 20, a work table 22 supported on the base 15 is formed to provide a head-stock 23 and a tail-stock 24 which respectively support aligned spindles 25 and 26 between the opposed ends of which a cam block 27 is adapted to be supported. The common axis of the spindles 25 and 26 is horizontal—i. e., it lies in a plane normal to the axis of the drum 18—and the work table 22 is so located that the distance between the spindle axis and the axis of the drum 18 corresponds to the distance between the receptive axes of the cam and rock shaft in the steering gear.

The particular cam-blank shown in the drawing comprises (Fig. 9) a central cylindrical body portion, in which the cam-groove is to be cut, and reduced-diameter end portions 30 through which the cam may be rotatably supported in the housing of the finished steering gear. In addition, the cam-blank is provided at its opposite ends with centers by which it may be located laterally of itself to be concentric with the spindles 25 and 26. As shown, the centers are male centers 31 and 32 formed by imparting a conical shape to the outer ends of the journals 30; but it is to be understood that female centers may be used if desired. The cylindrical body portion of the cam is provided at one end with a notch or groove 33 to facilitate positive rotation of the cam-blank during the cutting of the cam groove.

Within the tail-stock spindle 26, which does not itself rotate, I provide a rotating center 35 formed at its outer end to receive the center 31 of the cam-blank. The rotatable head-stock spindle 25 is provided with an axially slidable center 36 which, like the tail-stock center 35, is provided at its outer end with an axial opening adapted to receive the blank-center 32. The headstock center 36 is urged forwardly by a spring 37, movement of the center under the influence of the spring being limited by a bolt 38. For the purpose of transmitting torque from the headstock spindle 25 to the cam blank 27, an adapter 40 is secured to the end of the spindle. Such adapter is formed to engage a shoulder 41 on the cam blank to locate the latter axially of itself with reference to the axis of the drum 18. In addition, the adapter is provided with a key 42 received in the notch 33, in the cam body.

The shoulder 41 may be the inner case of a ball bearing through the medium of which the cam will be supported in the finished steering gear.

For the purpose of rotating the headstock spindle 25 there is secured to it (Fig. 7) a worm gear 45 meshing with a worm 46 which is operatively connected through gears 47 and 48 with a countershaft 49. The countershaft 49 extends outwardly from the headstock 23 (Fig. 6) and is there provided with a pulley 50 connected by a belt or belts 51 with a pulley 52 on the shaft of a driving motor 53. In the preferred machine, the motor 53 is a reversible hydraulic motor; but other types of motors may be used if desired.

As will be obvious from the contruction so far described, the conformation of the groove cut in the cam blank 27 will depend upon the relation between the respective speeds of rotation of the headstock spindle 25 and the drum 18. To control such relative speeds, the drum 18 and the spindle 25 are operatively interconnected through the medium of a rectilinearly slidable cam carried on a cam-slide 55 (Fig. 1) which is moved longitudinally of itself at a rate dependent upon the speed of rotation of the spindle 25 and which, through an appropriate cam follower and other mechanism to be hereinafter described, controls the speed of rotation of the drum 18. The mechanism for moving the cam-slide 55 longitudinally of itself comprises a vertically movable rack 56 which is operatively connected to the cam-slide 55 through the medium of a bolt 57 and turnbuckle 58 (see also Fig. 3). The rack 56 is supported for vertical sliding movement in a housing 60 which, for a purpose to become apparent hereafter, is in turn vertically movable in ways 61 supported from the base 15. For the purpose of moving the rack 56 vertically, it meshes with a pinion 63 which is fixed on a shaft 64 rotatably mounted in the housing 60.

Figures 3, 4:
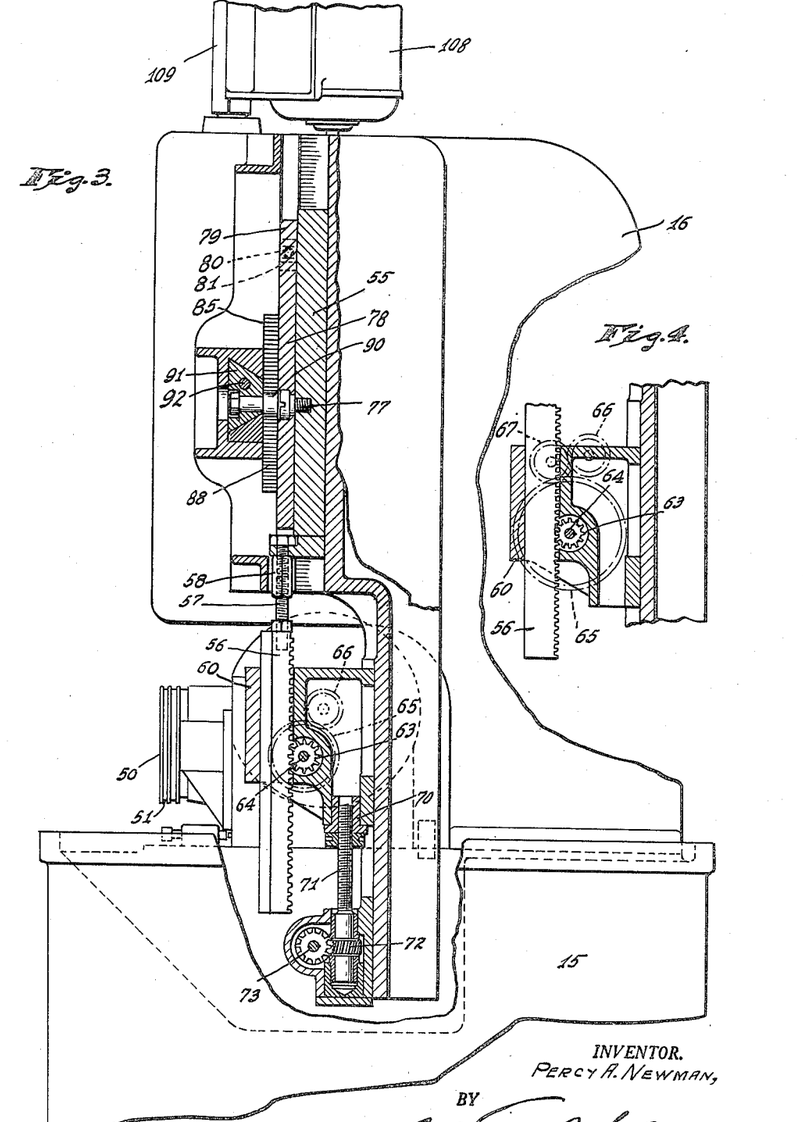
Fig. 4 is a fragmental view similar to Fig. 3 showing a modified arrangement of parts.
Figure 7:
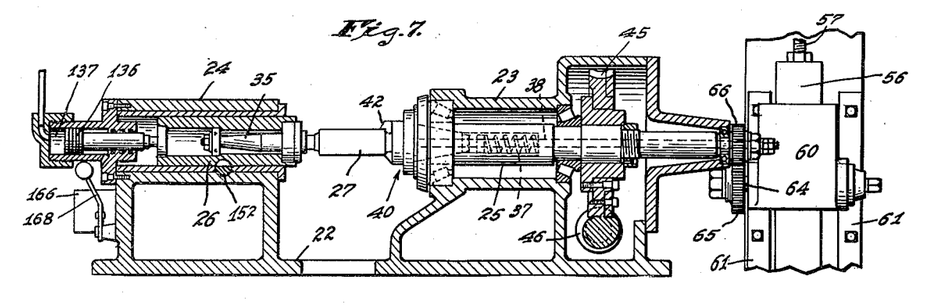
Fig. 7 is a vertical axial section through the mechanism of Fig. 6.

Exteriorly of the housing 60, the shaft 64 carries a driving gear 65 which is adapted for operative connection with a pinion 66 fixed to the rear end of the headstock spindle 25. The gear 65 may, as indicated in Figs. 3 and 7, mesh directly with the gear 66 or, if it is desired to reverse the relation between the direction of rotation of the headstock spindle 25 and the direction of movement of the cam-slide 55, the gear 66 may, as indicated in Fig. 4, mesh with an idler 67 rotatably supported from the housing 60, such idler in turn meshing with the gear 66 on the headstock spindle. By changing the relative sizes of the gears 65 and 66, the ratio between the speed of movement of the cam-slide 55 and the speed of rotation of the spindle 25 can be varied.

Figures 1, 10:
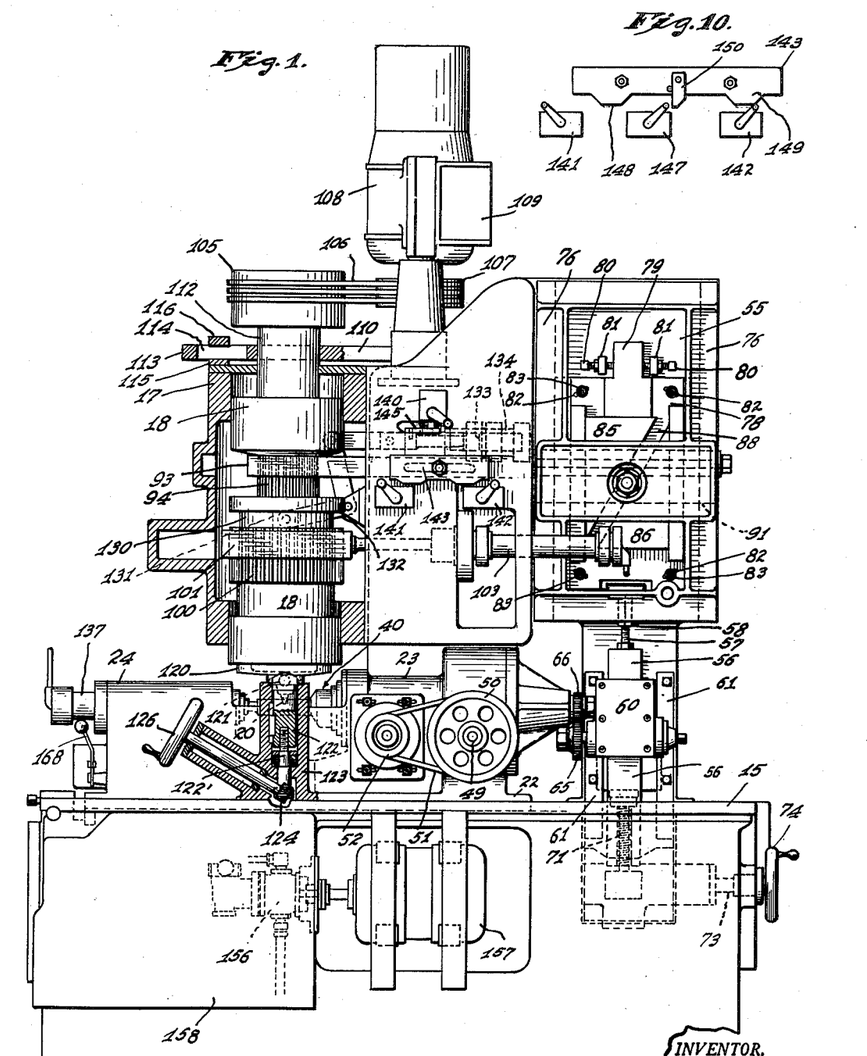
Fig. 1 is a front elevation of the machine, with parts thereof broken away.
Fig. 10 (Sheet 1) is a diagrammatic front elevation of an arrangement of controlling switches.
Figure 6:
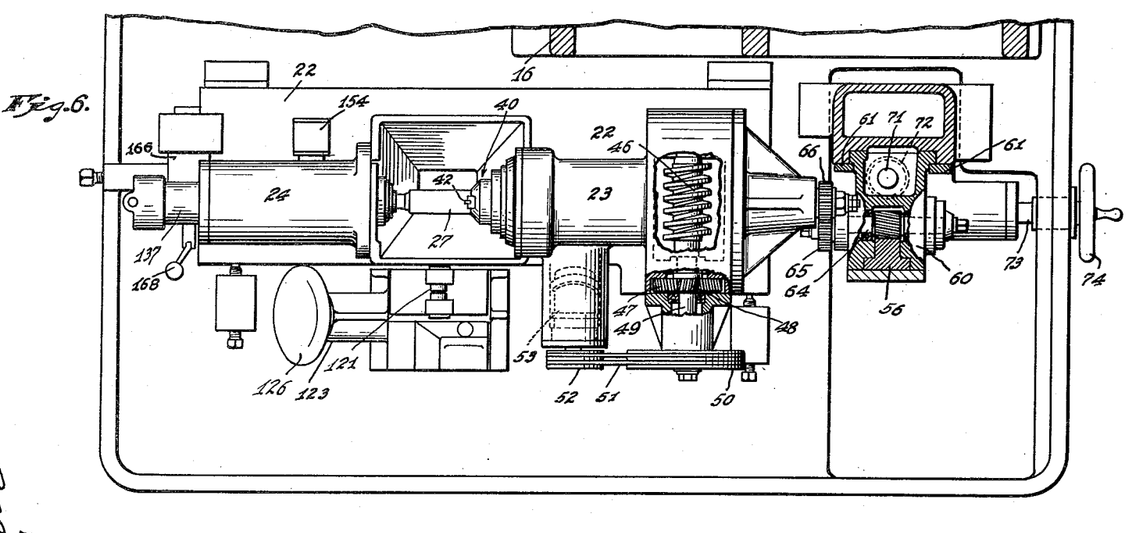
Fig. 6 is a plan view, in partial section, of the work table and associated parts.

It is to make possible the use of different-sized gears 65 and 66 that the housing 60 is made vertically adjustable in the ways 61. Any convenient means may be employed for locating the housing 60 in the proper vertical position, the means indicated in the drawing (Fig. 3) comprising a nut 70 which is secured in the housing 60 and which receives a vertical lead screw 71 rotatably mounted in the base 15. The lead screw 71 may be connected through gearing 72 with an adjusting shaft 73 which projects through the wall of the base 15 and is there provided with a hand wheel 74 (Figs. 1 and 6).

Figure 8:
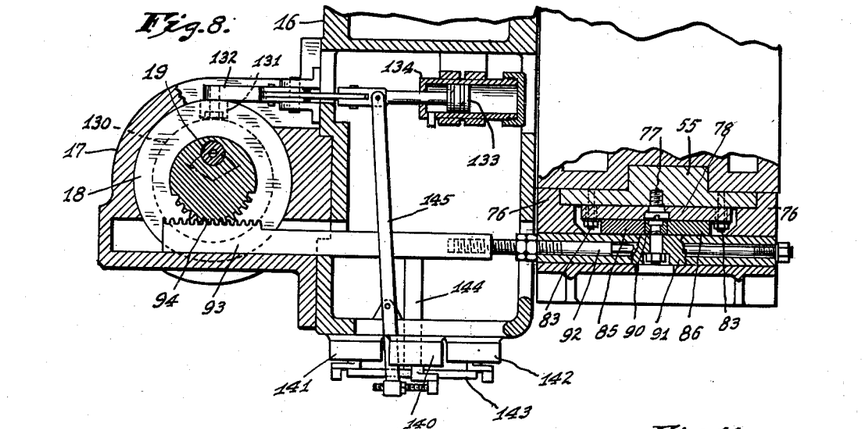
Fig. 8 is a horizontal section through the upper part of the machine.

The cam-slide 55 previously referred to is supported for vertical sliding movement in suitable guides 76 (Figs. 1 and 8) mounted on the opposite side of the housing 17 from the drum 18. The cam slide, in the preferred arrangement, is provided centrally with a swivel 77 upon which a compensating plate 78 is carried for angular adjustment. To control the angular position of the compensator plate 78 with reference to the cam-slide 55, it is provided with an outwardly projecting lug 79 received between two set screws 80 mounted in bosses 81 on the slide 55. To locate the compensator plate definitely in any position of adjustment, it is provided with arcuate slots 82 which receive clamp screws 83 extending into the cam slide.

Upon the compensator plate 78 there are located in fixed positions a pair of cam segments 85 and 86 having opposed surfaces which define between them a cam groove 88 extending obliquely of the path of travel of the cam slide 55. Such groove receives a cam-following roller 90 rotatably mounted on a slide 91 supported for horizontal sliding movement from the housing 17. The slide 91 is rigidly connected, as by means of a bolt 92, with a rack 93 which meshes with a gear or gear-sector 94 rigid with the drum 18.

As the headstock spindle 25 rotates it causes the cam slide 55 to move vertically at a speed bearing a definite ratio to the speed of spindle rotation; and as the cam-slide 55 moves vertically, the cam follower 90 in the oblique groove 88 moves horizontally at a controlled rate to move the rack 93 and cause the drum 18 to swing about its axis. Obviously, the ratio between the rate of movement of the cam-slide 55 and the rate of angular movement of the drum 18 about its axis will depend upon the obliquity of the groove 88.

Figure 5:
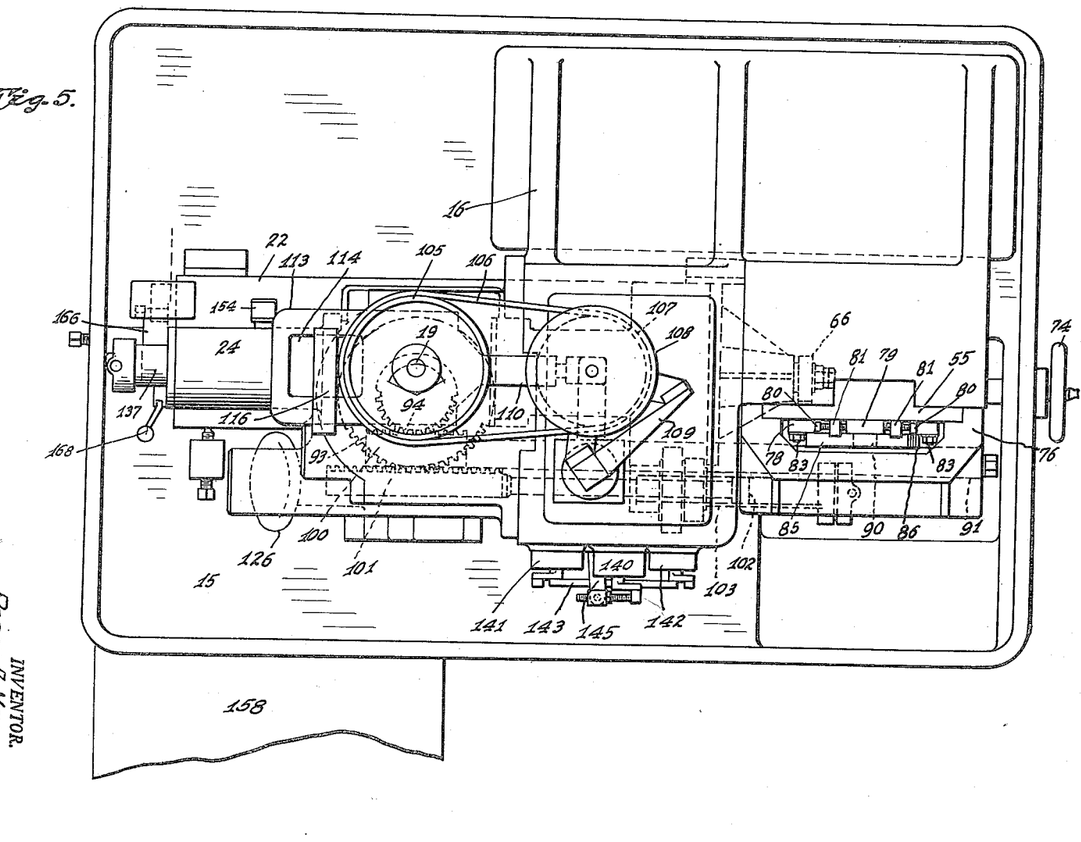
Fig. 5 is a plan view of the entire machine.

To remove all lost-motion or backlash and thus to insure that arcuate movement of the cutter 20 about the axis of the drum 18 will proceed at a definite rate determined by the obliquity of the groove 88, I apply to the drum 18 a load which opposes the effort exerted by the cam 85—86 on the cam follower. To this end, the drum 18 is provided with a second gear or gear-sector 100 which meshes with a rack 101 operatively connected to a piston 102 (Fig. 5) in a hydraulic cylinder 103. With this arrangement, two methods of operation are possible depending upon which end of the cylinder 103 is connected to a source of fluid pressure during the cutting operation. In other words, the hydraulic mechanism can be operated either to effect or to oppose feed of the rotating cutter 20 through the blank 27. In the former instance, the actual cutting effort is obtained from the hydraulic mechanism, and the rate of feed is controlled by the rate of vertical movement of the cam slide 55. In the other instance, the hydraulic mechanism opposes feed of the cutter through the cam blank to insure the imposition of a predetermined minimum load on the mechanism which operatively connects the headstock spindle 25 and the drum 18, thus insuring that all lost-motion in such mechanism will be taken up throughout the cam-cutting operation.

For the purpose of rotating the cutter spindle 19 it projects beyond the upper end of the drum 18 and the housing 17, where it is provided with a pulley 105 connected by a belt or belts 106 to a drive pulley 107 on the shaft of a spindle-driving motor 108. To accommodate for the arcuate movement of the cutter spindle 19 as the drum 18 rotates during the cam-cutting operation, the motor 108 is mounted on a bracket 109 which is swingably supported on a vertical axis from the top of the column 16 and which is connected by a link 110 with the spindle 19. The axes of pivotal interconnection of the link 110 with the spindle 19 and bracket 109 coincide respectively with the axis of the spindle and the axis of the pulley 107. The link 110 may be made of adjustable length to control the tightness of the belt 106.

It is desirable in most instances to provide for vertical movement of the drum 18 and of the cutter and cutter-spindle supported therefrom. To accommodate for such vertical drum-movement, the drum may be provided with an upwardly extending spindle-housing 112 (Fig. 1) which surrounds and is concentric with the spindle 19 and which is rotatably and slidably received in the adjacent end of the link 110. The link 110 has an integral extension 113 (Fig. 5) provided with an opening 114; and a boss 115 projecting upwardly from the top of the column 16 carries a retainer 116 which overlies the link-extension 113. With such an arrangement, the link 110 is confined to movement in a single horizontal plane by the top of the column and the retainer 116, and hence does not bind on the spindle-housing 112 as the drum 18 moves vertically. The opening 114 is of course made sufficiently larger than the boss 115 to prevent interference with movement of the link in its plane as the drum 18 rotates.

As has been noted above, the drum 18 is axially slidable as well as rotatable in the housing 17. This permits the cutter 20 to be positioned properly with reference to the blank-axis during the cutting operation and also permits the cutter to be elevated above the blank to provide greater clearance during removal and insertion of blanks.

To accommodate for axial movement of the drum 18 the pulley 105 has a face-width great enough to enable it to remain in cooperative relation with the belts 106, and the gear sectors 94 and 100 have face widths great enough to enable them to remain in meshing engagement with the respectively associated racks 93 and 101. During the cutting operation, the vertical disposition of the cutter 20 may be controlled by a cam or cam-segment 120 which is secured to the lower end of the drum 18 and which rests on a roller 121 mounted on an axis radial of the drum. The roller 121 is supported on the upper end of a member 122 which is mounted for vertical sliding movement in a housing 123 secured to the base 15. In its lower end, the member 122 is provided with a screw-threaded axial opening receiving a lead screw 122' connected, as through gearing 124, with an adjusting wheel or crank 126.

As will be obvious, with the spindle 18 urged downwardly by means hereinafter described to hold the cam 120 in contact with the roller 121, the vertical elevation of the cutter 20 during the cutting operation will depend upon the contour of the cam 120. By adjusting the wheel 126, the roller 121 may be raised or lowered as desired to establish for the spindle a base elevation departures from which are controlled by the cam. Change of elevation of the cutter 20 during the cutting operation will ordinarily be relatively slight, as its chief purpose is to accommodate the cam to compensate for wear.

To move the spindle 18 vertically to offset engagement and disengagement of the cam 120 with the roller 121, it is provided with an annular groove 130 which receives a block 131 pivotally mounted on one arm of a bell crank 132. The other end of the bell crank is operatively connected with a piston 133 which is slidable in a cylinder 134. Referring to Fig. 1, it will be obvious that upon the application of fluid pressure to the left-hand end of the cylinder 134, the piston 133 will be moved to the right to swing the bell crank 132 and elevate the spindle 18, thus freeing the cutter 19 from engagement with the blank and/or providing more room for removal and insertion of the blank. Conversely, the application of fluid pressure to the right-hand end of the cylinder 134 will move the piston 133 to the left to lower the spindle 18 and force the cam 120 into engagement with the roller 121.

Like vertical movement of the drum 18, advance and retraction of the tailstock spindle 26 may be accomplished by hydraulic means. To this end, the tailstock spindle 26 (Fig. 7) is operatively connected with a piston 136 slidable in a cylinder 137 to either end of which fluid pressure can be applied by appropriate valve means.

Automatic or semi-automatic control of the machine may be provided in response to the movement of various parts. Conveniently, such automatic or semi-automatic control is exercised through the means of limit switches, three of which are shown in Fig. 1. The switches there shown comprise a switch 140, actuated by the mechanism which moves the drum 18 vertically, and two switches 141 and 142 which are controlled in response to movements of the rack 93. Means for operating the switches 141 and 142 may comprise a switch actuator 143 operatively connected (Fig. 8) with the rack 93 as by being attached to the outer end of an arm 144 projecting forwardly from the rack 93. Mechanism for operating the switch 140 may comprise a pivoted lever 145, the rear end of which is operatively connected with the piston 133 and the front end of which co-operates with the switch 140.

For fully automatic operation of the machine, I may employ a third switch, indicated at 147 in Fig. 10, controlled by movement of the rack 93. As will be apparent from Fig. 10, the switches 141 and 142 are controlled respectively by bosses 148 and 149 on the actuator 143, while the switch 147 is controlled by a dog 150 movably mounted on the actuator 143. It is assumed in Fig. 10 that during the cutting of the cam the rack 93 will move from right to left, and the dog 150 on the actuator 143 is arranged to override the switch 147 without operating it during such forward feeding movement of the rack 93 but to actuate the switch 147 during the return stroke of the rack. The manner in which the switches 141, 142, and 147, as well as the switch 140, control the various operations in the machine will be brought out hereinafter.

Figures 9, 11:
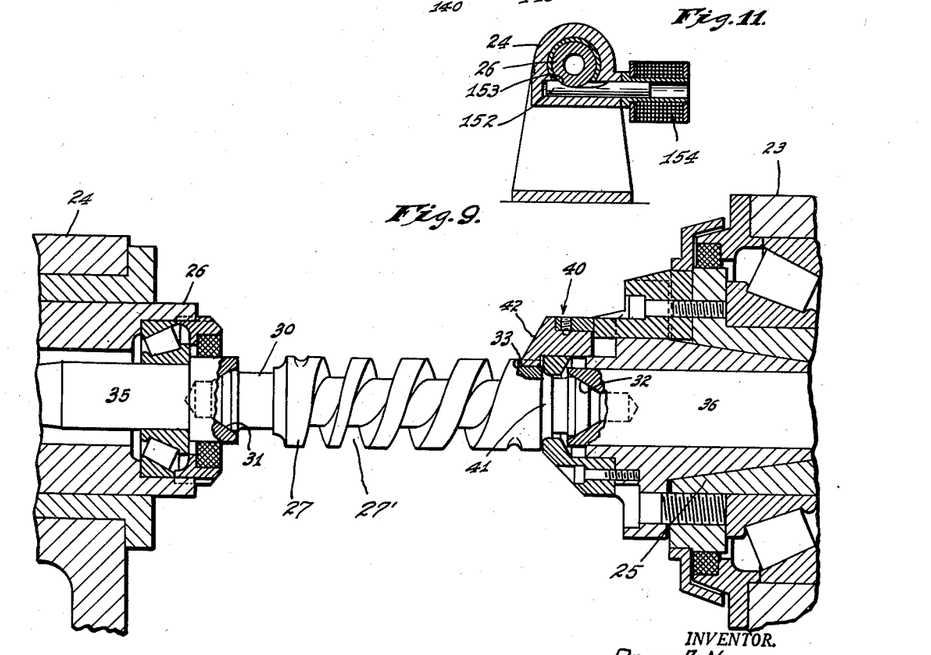
Fig. 9 is a fragmental view similar to Fig. 7 but on an enlarged scale.
Fig. 11 (Sheet 6) is a transverse vertical section through the tailstock.

If desired, the tailstock 24 may be provided with means for locking the tailstock spindle 26 in advanced position to insure against accidental retraction of the tailstock spindle and dropping of the blank 27 during the cutting operation. One suitable form of spindle-clamping means is illustrated in Fig. 11, where I have shown the tailstock 24 as provided with a clamping member 152 mounted for sliding movement generally tangentially of the tailstock spindle 26 and provided with a spindle-engaging surface 153. The clamping member 152 may project laterally from the tailstock 24 into association with a solenoid 154 which, when energized, will operate to force the spindle-clamping surface 153 against the spindle 26 and prevent its longitudinal movement.

As a source of fluid under pressure for use in advancing and retracting the tailstock spindle 26, in raising and lowering the drum 18, in actuation of the rack 101, and in operating the motor 53, I may employ a pump 156 adapted to be driven by an electric motor 157. Conveniently, the pump 156 is located in a sump 158 associated with the base 15 of the machine and is arranged to draw liquid from such sump and to discharge it, under the control of valves to be described hereinafter, to the various hydraulically operated devices.

Figure 12:
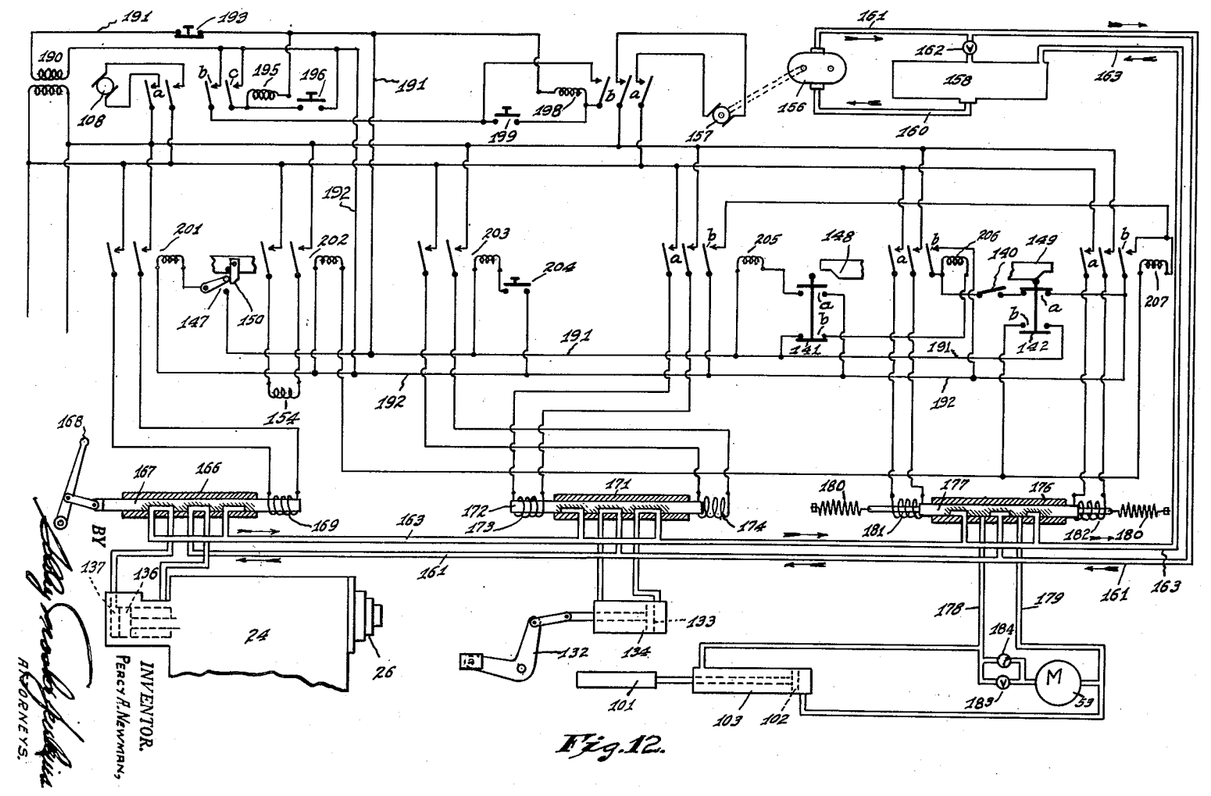
Fig. 12 is a diagrammatic illustration of electrical and hydraulic connections.

In Fig. 12 I have illustrated diagrammatically one arrangement of electrical and hydraulic connections by which completely automatic control of the cam-cutting machine may be effected. As there indicated, the pump 156 withdraws liquid from the sump 158 through a pipe 160 and discharges such liquid under pressure into a pipe 161. The pipe 161 has associated with it a pressure-relief valve 162 discharging into the sump 158. The pipe 161, containing liquid under pressure, is adapted to be connected by appropriate valve mechanism with the various hydraulically operated devices fluid from which flows through a return pipe 163 to the sump 158.

Hydraulic operation of the tailstock spindle 26 is controlled by a valve 166 having a movable valve member 167 which can be moved alteratively to connect either end of the cylinder 137 to the fluid supply line 161 and simultaneously to connect the other end of the cylinder to the return line 163. In the particular arrangement illustrated in Fig. 12, the valve member 167 is movable under the control of a hand lever 168 and a solenoid 169, the solenoid operating when energized to connect the right-hand end of the cylinder 137 to the fluid-supply line 161.

A similar valve 171 having a movable valve member 172 is employed to control the supply of fluid to the cylinder 134 and thus to control vertical movement of the drum 18. Movement of the valve member 172 is controlled by two solenoids 173 and 174, the former operating when energized to position the valve member 172 to connect the left-hand end of the cylinder 134 to the fluid-supply line 161 and the latter operating when energized to connect the right-hand end of the cylinder 134 to such fluid-supply line.

A third valve 176, similar to the valves 166 and 171 and embodying a movable valve member 177, controls the supply of fluid under pressure to the reversible hydraulic motor 53. That motor has two ports, which are connected respectively to two ports of the valve 177 by conduits 178 and 179, and is so constructed as to rotate in one direction when fluid under pressure is supplied to it through the conduit 178 and in the opposite direction when it receives fluid under pressure from the conduit 179. The valve member 177 is biased, as by opposed springs 180, toward a neutral position in which neither of the conduits 178 and 179 is connected to the fluid supply line 163 and is adapted to be moved in opposite directions from such neutral position by two solenoids 181 and 182. The arrangement is such that when the solenoid 181 is energized the valve member 177 is moved to connect the conduit 178 to the supply line 163 and the conduit 179 to the return line 163. Conversely, when the solenoid 182 is energized, the valve member 177 is moved in the other direction into a position in which the conduit 179 is connected to the supply line 161 and the conduit 178 to the return line 163. When neither solenoid is energized, the springs 180 hold the valve member 177 in its neutral position. For the purpose of explaining operation, it is assumed that energization of the solenoid 181 to connect the conduit 178 with the supply line 161 will result in forward rotation of the motor 53, or rotation in the direction employed in the cam-cutting operation. To control the speed of the motor during the cam-cutting operation, the conduit 178 may embody a flow-regulating valve 183, and to prevent such valve from reducing speed of the motor 53 during its reverse rotation, a bypass including a check valve 184 is provided around such valve.

The lost-motion take-up mechanism embodying the rack 101, piston 102, and cylinder 103, which imposes on the drum 18 a load opposing its rotation during the cam-cutting operation, may conveniently be controlled jointly with the motor 53. For this purpose, and as indicated in Fig. 12, the left-hand end of the cylinder 103 is connected to the conduit 178 and the right-hand end to the conduit 179.

The spindle-driving motor 108, the pump-driving motor 157, and the various solenoids above mentioned are arranged to be controlled by individual relays. Desirably, the motors and solenoids are adapted to be operated by some readily available current, such as the common 110 volt, 60-cycle alternating current, while the various control relays are low-voltage relays operating on current derived from a step-down transformer 190 over conductors 191 and 192. One of such conductors 191 and 192hoflmofbersrpwaETAOI conductors, shown as the conductor 191, desirably includes a normally closed, master stop switch 193 which can be manually opened at any time to de-energize all the control relays and stop operation of the machine.

The supply current to the spindle-driving motor 108 is controlled by a relay 195 having contacts $a$ in circuit with the motor 108, and two pairs of holding contacts $b$ and $c$. The winding of the relay 195 is connected across the relay-supply conductors 191 and 192 through a normally open, manually closable switch 196 with which the holding contacts $c$ of the relay are in parallel. Upon a momentary closing of the switch 196, the relay 195 is energized to close all its contacts. Closing of the contacts $a$ results in supply of current to the spindle-driving motor 108, while closing of the contacts $c$ completes a holding circuit including the winding of the relay 195 and thus maintains such relay energized until the master stop switch 193 is opened. Closing of the contacts $b$ is without effect on the relay 195, but does perform a function to be hereinafter set forth.

The pump-driving motor 157 is controlled by a relay 198 having contacts $a$ controlling the supply of current to the motor 157 and a pair of holding contacts $b$. The relay-winding 198 is connected across the conductors 191 and 192 in series with both a normally open, manually closable switch 199 and with the contacts $b$ of relay 195, while the contacts $b$ of relay 198 are connected in parallel with the switch 199. As a result of the fact that the winding of relay 198 is connected to the conductors 191 and 192 through the contacts $b$ of the relay 195, the relay 198 can be energized to cause operation of the pump-driving motor 157 only when the relay 195 is closed to cause operation of the spindle-driving motor 108.

The two switches 141 and 142, which are operated in movement of the rack 93, are both double-pole, double-throw switches each having two sets of contacts $a$ and $b$ one of which is open when the other is closed. The switch 147, which is also operated in movement of the rack 93 as above set forth, is a normally open, single-pole switch adapted to be closed momentarily near the end of the cutter-return stroke of the rack 93. The switch 140, operated by the mechanism which raises and lowers the drum 18 is a single-pole switch normally open when the drum 18 is raised but closed when such drum is lowered.

The solenoid 169 which operates when energized to move the valve member 167 to retract the tailstock spindle 26 is controlled by a relay 201. The winding of the relay 201 is connected across the conductors 191 and 192 in series with the normally open switch 147.

The solenoid 154, which operates when energized to lock the tailstock spindle against longitudinal movement, is controlled by a relay 202 the winding of which is connected across the conductors 191 and 192 through the contacts $b$ of limit switch 142.

The solenoid 174, which positions the valve member 172 to cause lowering of the drum 18, is controlled by a relay 203 whose winding is connected to the conductors 191 and 192 through a normally open, cycle-start switch 204. The solenoid 173, which positions the valve member 172 to cause raising of the drum 18, is controlled by the contacts $a$ of a relay 205 which also embodies a set of holding contacts $b$. The winding of relay 205 is connected through the contacts $a$ of limit switch 141 to the conductors 191 and 192.

The remaining relays 206 and 207 respectively control solenoids 181 and 182 which, in turn, control operation of the motor 53 and the backlash take-up mechanism 101—103. Each of those relays comprises pairs of contacts $a$ controlling the associated solenoid and a pair of auxiliary contacts $b$.

The winding of the relay 206 is included in a circuit extending from the conductor 191, through the contacts $b$ of limit switch 141, the relay winding, the switch 140, and the contacts $a$ of limit switch 142 to the conductor 192. The contacts $b$ of relay 206, when closed, provide connection of the winding of that relay to the conductor 192 irrespective of the condition of switch 140 and contacts $a$ of switch 142. The winding of relay 207 is connected in a circuit extending from the conductor 191 through the contacts $b$ of limit switch 142, the relay winding, and the contacts $b$ of relay 205 to the conductor 192. The contacts $b$ of relay 207 are in parallel with the contacts $b$ of relay 205.

*Operation*

Figure 2:
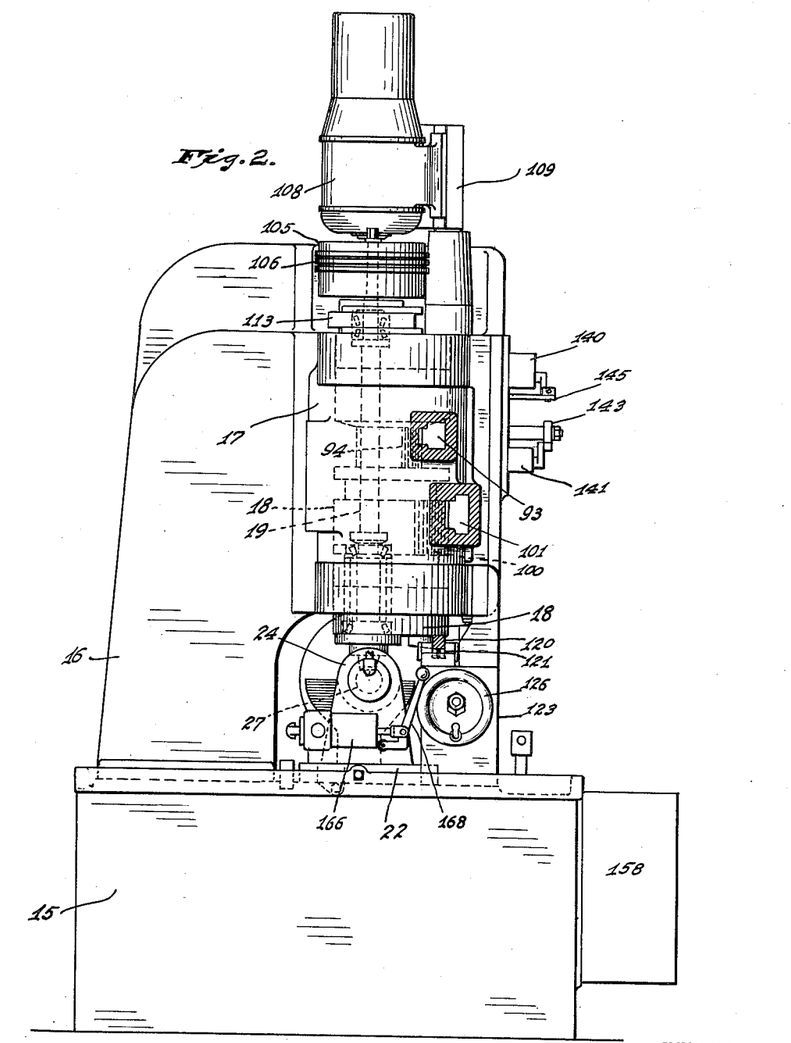
Figs. 2 and 3 are elevations, each with parts broken away, illustrating respectively the left and right sides of the machine.

Figs. 1, 2, and 3 illustrate the drum 18 as lowered, the racks 93 and 101 as at the midpoints of their respective range of movement, and the cutter 20 and cutter-spindle 19 as at the midpoint of their arc of travel. It will be understood, however, that at the beginning of a cam-cutting operation, the cutter 20 will be at one end of its arc of travel.

The parts of the machine illustrated in Fig. 12 are shown in the position existing at the start of a cycle. As previously indicated, it is assumed that the drum-rotating rack 93 will move to the left during the cam-cutting operation, and such rack will therefore be at the right-hand limit of its travel with the boss 149 of the switch actuator plate 143 in engagement with the switch 142 to hold the contacts $a$ thereof closed and the contacts b thereof open in opposition to an appropriate biasing means incorporated in such switch. The other switch-actuating boss 148 will be disposed out of engagement and to the right of the limit switch 141, and an appropriate biasing means associated with such switch will maintain the contacts a thereof open and the contacts b closed. At the beginning of the cycle, the drum 18 will be in its upper position to elevate the cutter and facilitate insertion of a cam blank 27, and the piston 133 in the cylinder 134 will be near the right-hand end of such cylinder, being held there by fluid pressure applied to the left-hand end of the cylinder under the control of the valve 171 which was set in the position to accomplish that end by energization of the solenoid 173 during the preceding cycle. The tailstock 26 will be retracted by fluid pressure applied to the right-hand end of the cylinder 137 under the control of the valve 166. Energization of the solenoid 169 during the preceding cycle has resulted in a setting of the valve 166 which provides for the application of fluid pressure to the right-hand end of the cylinder 137. All the relays 201, 202, 203, 205, 206, and 207 will be open.

To begin a cycle, the operator places a blank 27 between the headstock and tailstock spindles and operates the lever 168 to move the valve member 167 of the valve 166 to the left. When this occurs, fluid pressure is applied to the left-hand end of the cylinder 137 to advance the tailstock 26 and clamp the blank between the centers 35 and 36. Assuming that the spindle-driving motor 108 and the pump-driving motor 157 have been started by successive momentary closings of the switches 196 and 199, the operator now closes the cycle-start switch 204 to energize the relay 203 and thereby cause current to be supplied to the solenoid 174. Upon energization of such solenoid, the valve member 172 is drawn to the right to connect the right-hand end of the cylinder 134 to the fluid supply line 161 and the left-hand end of such cylinder to the return line 163. As a result, the piston 133 will be moved to the left in the cylinder 134 to swing the bell crank 132 in a counter-clockwise direction, and thus, in the manner previously brought out, to lower the drum 18 until the cam 120 engages the roller 121 which determines the vertical position of the cutter 20. In this leftward movement of the piston 133, the lever 145 (Fig. 8) operates to close the switch 140. As both the contacts 141b and 142a are already closed, closing of the switch 140 energizes relay 206 to cause current to be supplied to the solenoid 181. The concurrent closing of the auxiliary contacts b of relay 206 completes a holding circuit which is in parallel with the series-connected switch 140 and contacts 142a but which includes contacts b of limit switch 141. Energization of the solenoid 181 causes the valve member 177 to move to the left from its neutral position, thus connecting the conduit 178 to the fluid supply line 161 and the conduit 179 to the return line 163. The resultant flow of fluid through the motor 53 under control of the valve 183 causes the motor to operate to drive the headstock spindle 40 and, through it, the mechanism which produces vertical movement of the cam slide 55. Simultaneously, pressure is applied to the left-hand end of the cylinder 103 to oppose the leftward movement of the rack 101 which accompanies leftward drum-rotating movement of the drum-driving rack 93 under the control of the cam 85—86.

As the cam slide 55 moves vertically, the cam follower 90 traverses the oblique groove 88 thus, under the assumed conditions, causing leftward movement of the rack 93 and clockwise (Fig. 8) rotation of the drum 18. During this movement of the drum, the cutter 20 swings in a circular arc; and as the blank 27 is being simultaneously rotated, the cutter forms in the blank a generally helical groove 27' such as is shown in Fig. 9.

As the rack 93 moves to the left from the position it occupies at the start of the cycle, the switch-actuator boss 149 moves out of engagement with the limit switch 142 to open the contacts a and close the contacts b thereof. Opening of the contacts a of switch 142 is without any immediate effect on the relay 206; as such relay remains energized by reason of the engagement of its contacts b in the holding circuit. Accordingly, the solenoid 181 remains energized and the motor 53 continues to operate in the forward direction. Closing of the contacts b of switch 142 completes a circuit from the conductor 191, through such contacts and the winding of relay 202 to the conductor 192. Energization of the relay 202 causes current from the supply line to be supplied to the solenoid 154 which operates to engage the tailstock clamp 152 to prevent any accidental release of the tailstock spindle.

When swinging movement of the cutter 20 has progressed far enough to complete the cutting of the groove in the cam blank, the boss 148 on the actuator 143 engages the switch 141 to close the contacts a thereof and open the contacts b thereof. As the contacts b are in series with the winding of relay 206, such relay is immediately de-energized to de-energize the solenoid 181 of the motor-control valve 176. The closing of contacts a of switch 141 causes energization of the relay 205, and the resultant closing of contacts a of such relay energizes the solenoid 173 causing it to operate the valve 171 so that fluid under pressure will be supplied to the left-hand end of the cylinder 134. The fluid supplied to the cylinder 134 moves the piston 133 therein to the right, thus causing the drum 18 to be elevated. Upon this upward movement of the drum 18, the switch 140 is restored to its normally open position; but no action occurs as the result of such switch-opening as the circuit through the switch was previously broken by the opening of contacts 142a at the beginning of the cycle.

Simultaneously with the closing of the contacts a of relay 205 to cause elevation of the drum 18, the contacts b of such relay close to complete a circuit from the conductor 191 through the closed contacts 142b, the winding of relay 207, and the contacts 205b to the conductor 192. This causes energization of the relay 207, whose contacts a close to energize the solenoid 182, which operates the valve 176 to reverse the flow of fluid through the motor 53. The concurrent closing of the relay contacts 207b completes a holding circuit which includes the winding of relay 207 and the contacts b of limit switch 142.

The reversed rotation of the motor 53 moves the cam slide 55 to cause the rack 93 to move to the right, thus rotating the drum 18 to restore the cutter to its initial position. As the rack 93 begins its rightward movement, the switch-actuator boss 148 moves out of engagement with the limit switch 141 to open the contacts a and close the contacts b thereof. The change in the condition of neither of these contacts has any immediate effect on the movement of machine elements. Although opening of the contacts 141a does de-energize the relay 205, interrupt the supply of current to the solenoid 173, and open the contacts 205b, the valve member 172 remains in the position to which it was moved when the solenoid 173 was initially energized and the relay 207 remains energized because its winding is included in the holding circuit through contacts 207b and 142b. The closing of contacts 141b is without effect, as the circuit including the contacts and winding of relay 206 was already open. In consequence, the solenoid 182 remains energized and the motor 53 continues to operate in the reverse direction to move the rack 93 to the right. As rightward movement of the rack 93 nears completion, the dog 150 on the switch-actuator 143 momentarily closes the switch 147 to energize the relay 201 and cause current to be supplied to the solenoid 169. Such solenoid operates, when energized, to reverse the valve 166 and supply fluid under pressure to the right-hand end of the cylinder 137. The pressure thus applied to the piston 136 urges the tailstock spindle 26 in the direction of retraction; but as the clamp 152 is still engaged, the tailstock remains advanced.

Upon completion of the return movement of the rack 93, the projection 149 on the switch-actuator 143 re-engages the limit switch 142 to close the contacts a and open the contacts b thereof. Closing of the contacts a is without immediate effect as the circuit containing them has already been opened; but opening of the contacts 142 opens the circuits through both the relays 202 and 207, thus causing de-energization of the clamp-actuating solenoid 154 and of the valve-controlling solenoid 182. When the clamp-actuating solenoid 154 is de-energized, the clamp 152 is released; and fluid pressure in the right-hand end of the cylinder 137 retracts the tailstock 26. De-energization of the valve-controlling solenoid 182 frees the valve member 177 for movement under the influence of the springs 180, which operate to restore such valve member to its neutral position in which supply of fluid to the motor 53 is shut off, thus bringing the headstock spindle and the cam slide 55 to rest.

When the machine operates in the manner above described, the mechanism including the rack 101, sector 100, piston 102, and cylinder 103 acts merely to take up lost motion or back-lash by insuring that the cam 85—86 and the remainder of the cutter-feeding mechanism will, during the cutting operation, never be subjected to a load less than a predetermined minimum. In this connection, it is to be noted that the headstock spindle 25 forms an element of the power-transmitting train interconnecting the motor 53 and the drum 18 and that, in consequence, all lost motion between the spindle 25 and the drum is taken up, and maintained taken up throughout the cutting operation, by fluid pressure in the cylinder 103.

It has been noted above that the mechanism 100—103 can be used alternatively in two ways, either to take up lost motion while cutter-feeding effort is applied to the drum 18 through the rack 91 and cam 85—86 or to exert the cutter-feeding effort itself and to rotate the drum 18 at a rate controlled by the cam. The arrangement employed to provide operation in the first manner has already been described. To provide for operation in the second manner it is necessary only to reverse the connections between the cylinder 103 and the conduits 178 and 179 and to insure the existence of sufficient pressure in the cylinder 103 to force the cutter through the blank during the cutting operation. In the first case, with the cam-groove 88 having the obliquity indicated in Fig. 1 and with the racks 91 and 101 moving to the left during the cutting operation, the reaction of the blank on the cutter and the pressure in the left-hand end of the cylinder 103 both serve to hold the cam-follower 90 in contact with the cam-segment 86; and the latter, as it rises, rotates the drum 18, forces the cutter through the work, and causes fluid under pressure to be expelled from the cylinder 103. In the second case, under the same assumed conditions, fluid-pressure in the right-hand end of cylinder 103 rotates the drum in the clockwise direction, urges the rack 91 to the left, and holds the cam follower 90 in contact with the cam-segment 85; and the latter, as it rises, merely controls the rate at which the drum rotates under the effort applied to it by the rack 101. In both cases all lost motion between the drum and headstock spindle is taken up.

Fig. 12 is intended to represent one arrangement of connection and control apparatus through which automatic operation of the machine may be accomplished. Other arrangements are possible; and in most instances it will be desirable to include in the apparatus switch mechanisms by which control of movements of individual parts may be exercised in order to facilitate setting up the machine.

The effective pitch of the cam cut by the machine will depend upon the shape of the cam-groove 88, the setting of the compensator plate 78, and the ratio of the gearing interconnecting the headstock spindle with the cam-slide 55. If the cam-groove 88 is straight, the effective pitch of the cam will be uniform throughout the extent of the cam; but by employing cam-segments 85 and 86 which will provide a groove having differently inclined portions, a cam of non-uniform pitch can be produced. A steering gear embodying such a cam is disclosed in my prior Patent No. 2,071,235. Fine adjustments to effect small changes in cam-pitch may be secured by changing the angular position of the compensator plate 78 on the cam slide, while coarser adjustments to effect larger changes in pitch may be secured by altering the ratio of the gear train interconnecting the headstock spindle and cam-slide. The same set of cam segments 85 and 86 can be used alternatively to cut either left-hand or right-hand cams by interposing the idler 67 in, or removing it from, such gear train.

While I have described my machine above as adapted to cut a cam-groove in a blank, it will be obvious that it is equally adapted to grinding a cam previously cut. To convert the machine to a grinder it is necessary only to substitute a properly shaped abrasive wheel for the cutter 20 and to employ a spindle-driving means which will provide an adequate wheel-speed.

I claim as my invention:

1. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, mechanism for rotating said tool-spindle support and headstock spindle in timed relation, and control means responsive to advance of said tool-spindle support for automatically initiating operation of said spindle-rotating mechanism.

2. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, mechanism for rotating said tool-spindle support and headstock spindle in timed relation, and control means controlled by rotation of said tool-spindle support for automatically causing said support-moving means to retract the tool from association with the blank.

3. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, mechanism for rotating said tool-spindle support and headstock spindle in timed relation, and control means comprising devices responsive to rotation and axial movement of said tool-spindle support for causing the machine to proceed automatically through a cycle including the steps of advancing the tool-spindle support, rotating such support from a predetermined initial position, retracting the support, and rotating it reversely to its initial position.

4. In a machine for forming generally helical cams, means including a headstock spindle and a tailstock spindle for supporting and rotating a cam blank, said tailstock spindle being axially movable into and from an advanced, blank-supporting position, means for locking said tailstock spindle in said advanced position, a rotatable tool-spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, mechanism for rotating said tool-spindle support and headstock spindle in timed relation, and control means automatically controlled in response to movement of said tool-spindle support for actuating said locking means and maintaining it actuated throughout cam-forming rotation of said tool-spindle support.

5. In a machine for forming generally helical cams, means including a headstock spindle and a tailstock spindle for supporting and rotating a cam blank, said tailstock spindle being axially movable into and from an advanced, blank-supporting position, means for locking said tailstock spindle in said advanced position, a rotatable tool spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, mechanism for rotating said tool-spindle support and headstock spindle in timed relation, and control means comprising devices responsive to rotation and axial movement of said tool-spindle support for causing the machine to proceed automatically through a cycle including the steps of advancing the tool-spindle support, actuating said locking means, rotating said support from a predetermined initial position, retracting the support, rotating it reversely to its initial position, and releasing said locking means.

6. A machine as set forth in claim 3 with the addition that the means for rotating the headstock spindle and tool-spindle support comprises a reversible motor, said control means operating to reverse said motor following the completion of rotation of the tool-spindle support from its initial position.

7. In a machine for forming cams and the like, headstock and tailstock spindles, said tailstock spindle being advanceable into and retractable from an operative position in which it cooperates with the headstock spindle to support a blank, means operable to bias said tailstock spindle for retraction, locking means for holding said tailstock spindle advanced, a tool spindle, a movable support therefor, means for moving said support from an initial position to cause a tool in the tool spindle to act on the blank and for subsequently restoring the support to its initial position, a device responsive to movement of said support for releasing said locking means as said support approaches its initial position, and means also responsive to movement of said support and operable prior to operation of said last-named device for actuating said biasing means.

8. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, means for moving said tool-spindle support axially of itself to advance a tool in the tool spindle into and retract it from operative association with a blank in said blank-supporting means, adjustable means for varying the advanced position of said support, and mechanism for rotating said support and headstock spindle in timed relation.

9. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, power-operated means for moving said tool-spindle support axially of itself to advance a tool in the tool spindle into and retract it from operative association with a blank in said blank-supporting means, adjustable means for varying the advanced position of said support, and mechanism for rotating said support and headstock spindle in timed relation.

10. In a machine for forming generally helical cams, means including a headstock spindle for supporting and rotating a cam blank, a rotatable tool spindle, a tool-spindle support rotatable about an axis parallel but eccentric to the tool-spindle axis, means for driving said tool spindle, hydraulic means for moving said tool-spindle support axially of itself to advance a tool in the tool spindle into and retract it from operative association with a blank in said blank-supporting means, adjustable means for limiting advance of said support by said hydraulic means, and mechanism for rotating said support and headstock spindle in timed relation.

11. A machine as set forth in claim 8 with the addition that said adjustable means comprises a cam rigid with said support, a cam-engaging roller, a roller-support, and means for adjusting said roller-support axially of said tool-spindle support.

12. In a machine for forming generally helical cams, means including a headstock spindle for rotatably supporting a cam blank, a rotatable and axially movable spindle-support, a tool spindle eccentrically mounted in said spindle-support, reversible hydraulic means for moving said spindle-support axially of itself to advance a tool in said tool spindle into and retract it from operative association with a blank in said blank-supporting means, and reversible hydraulic means for rotating said headstock spindle and tool-spindle support in timed relation.

PERCY A. NEWMAN.

REFERENCES CITED

The following references are of record in the file of this patent:

UNITED STATES PATENTS

| Number | Name | Date |
| --- | --- | --- |
| 1,275,985 | Bock | Aug. 13, 1918 |
| 1,687,260 | Ross | Oct. 9, 1928 |
| 1,871,174 | Gruenewald | Aug. 9, 1932 |
| 1,960,460 | Schurr | May 29, 1934 |
| 2,448,426 | Galloway | Aug. 31, 1948 |